Jan. 5, 1954  P. T. BRANTINGHAM  2,665,176
BEARING
Filed Oct. 26, 1951

Inventor:
Paul T. Brantingham
By: Paul O. Pippel
Attorney.

Patented Jan. 5, 1954

2,665,176

UNITED STATES PATENT OFFICE 2,665,176

BEARING

Paul T. Brantingham, Fort Wayne, Ind., assignor to International Harvester Company, a corporation of New Jersey Application October 26, 1951, Serial No. 253,396

10 Claims. (Cl. 308—127)

This invention relates to shaft bearings and more particularly to lubricating means for supplying abundant quantities of lubricant to a new and improved bearing.

The primary object of the present invention is the provision of a plain radial journal bearing, as distinguished from an anti-friction type bearing, which is particularly adaptable for rotatably supporting a motor vehicle propeller shaft.

Another object is to provide bearing lubricating means whereby the bearing surfaces around the entire circumference of the bearing are enveloped in a layer of lubricant during operation of the bearing.

Still another object is the provision of a journal bearing housing having a pair of axially spaced lubricant reservoirs formed in the bottom thereof within which portions of the bearing surfaces are continually disposed.

A further object is to provide a journal bearing housing having a pair of axially spaced sealing means for embracing the rotatable shaft, the bottom of said housing being adapted to act as a lubricant reservoir for storing lubricant below the level of said sealing means but above a portion of the bearing surface whereby said bearing surface portion is always immersed in lubricant.

A further object is the provision of a pair of novelly constructed lubricant receiving chambers, passageways leading from said chambers to the bearing surfaces to be lubricated, and new and improved means for conveying lubricant from a pair of lubricant reservoirs to said receiving chambers.

A still further object is to provide an improved journal bearing which employs a rotating disk having its outer periphery curved toward a lubricant receiving chamber for elevating and directing the lubricant to the chamber.

Another object is the provision of an improved journal bearing which is relatively simple in construction, easy to manufacture and standardize for various installations, readily assembled and disassembled with respect to the shaft to be supported thereby, and has incorporated therein lubricating means capable of supplying copious quantities of lubricant for circulation to and through the journal bearing to assure maintenance of proper bearing films and also to abstract heat generated therein.

Still another object is the provision of a propeller shaft bearing which is quiet running and accommodates slight fore and aft movement of the shaft with respect to the bearing.

Figure 1:
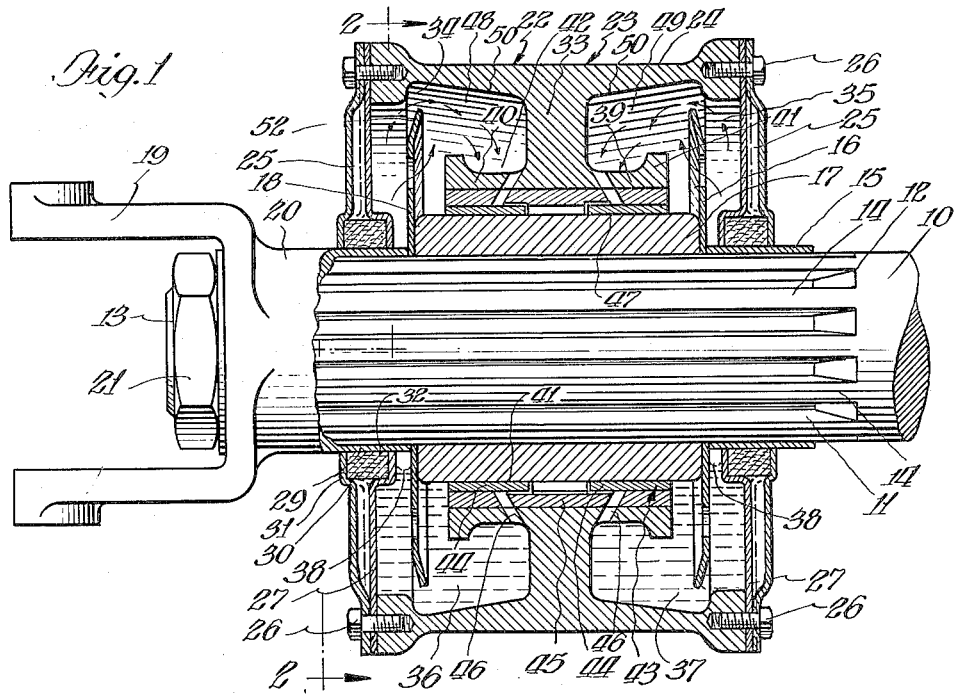
Figure 2:
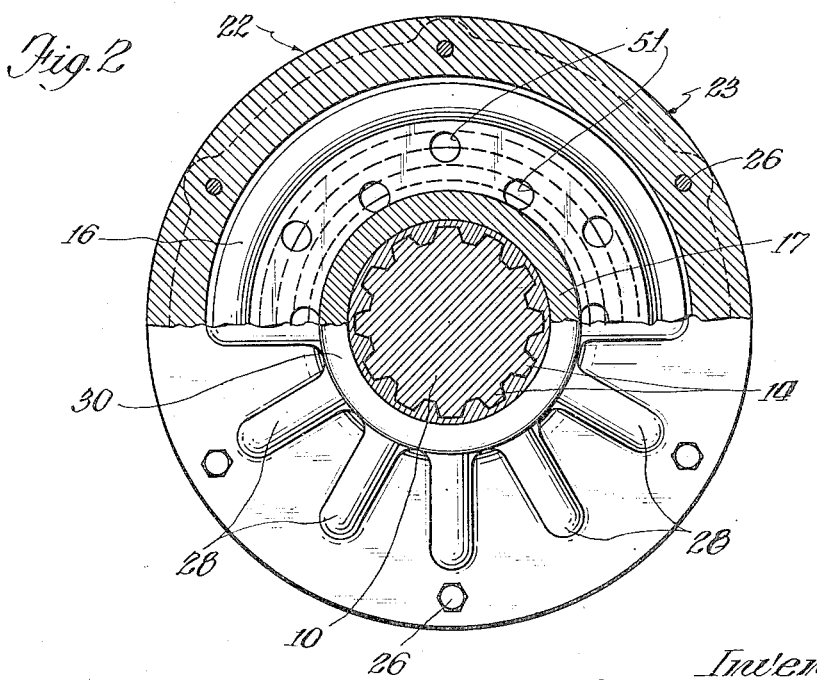

The foregoing and other important objects and desirable features inherent in and encompassed by the invention together with many of the purposes and uses thereof, will become readily apparent from a reading of the ensuing description in conjunction with the annexed drawings in which, Figure 1 is a vertical sectional view of the invention; and Figure 2 is an end elevational view taken substantially along line 2—2 of Figure 1.

Referring to the drawings wherein like reference characters represent like elements throughout the various views, there is shown a motor vehicle propeller shaft 10 disposed substantially horizontally. A section 11 of the shaft 10 has a reduced diameter to form an annular shoulder 12 at one end and has a threaded portion 13 defining its opposite end. The section 11 has a series of circumferentially spaced splines 14 machined therein substantially along the entire axial length thereof. A hardened steel spacer ring 15 having internal splines is slipped over the threaded portion 13 and moved to the right, as viewed in Figure 1, and caused to abut the annular shoulder 12. Positioned adjacent the spacer ring 15 is relatively thin disk 16, the purpose of which will be explained hereinafter. A cylindrical sleeve 17 abuts the disk 16 and is also provided with internal splines for mating with the splines 14 formed on section 11. It will be noted that the external diameter of sleeve 17 is substantially greater than the diameter of the spacer ring 15. A second disk 18, similar to disk 16, abuts the sleeve 17 and will be described in detail hereinafter. A conventional yoke 19 of a universal joint (not shown fully) is placed on the section 11 and has a hub portion 20 which engages the disk 18. All of the parts described hereinabove are clamped together and caused to rotate as a unit by means of a lock nut 21 engageable with the threaded portion 13.

The journal bearing unit designated in its entirety by reference character 22 includes a housing 23 which is readily secured to the vehicle chassis frame (not shown). The housing 23 comprises a substantially horizontally disposed open-ended cylindrical shell 24. Each end of the shell 24 is provided with a circular end plate 25 which is rigidly secured to the shell by means of a plurality of circumferentially spaced bolts 26 screwed into threaded recesses formed in the shell. The plates 25 are made from a pair of relatively thin stampings 27 having radially extending ribs 28 impressed therein to add rigidity and strength to the plates. A central opening 29 is provided in the plates 25 through which the section 11 of shaft 10 extends. The openings 29 are defined, as best shown in Figure 1, by an annular pocket 30 formed by axially spacing the inner marginal edges 31 of the stampings 27 of each plate 25. A ring of sealing material 32 such as felt or other material having like physical properties is confined within each pocket 30. The sealing ring 32 disposed on the right, as viewed in Figure 1, engages the spacer ring 15 and prevents the escape of lubricant contained within the housing 23 and the entrance of dirt and other foreign elements. The other ring 32 seals the opposite end of the housing 23 in a similar manner by engaging the hub portion 20 of the yoke 19.

A flange 33, integrally formed with the shell 24, extends inwardly and perpendicularly to the axis of rotation of the shaft 10. As best shown in Figure 1, the flange 33 is spaced substantially midway between the end plates 25 to divide the interior of the housing 23 into two compartments 34, 35 having substantially the same volume. The lower portion of each compartment 34, 35 serves as a reservoir 36, 37, respectively, for lubricant, the normal level of which is below the sealing rings 32 as designated by numeral 38. Integrally formed with the flange 33 and encircling the shaft 10 is a sleeve 39. The sleeve 39 has portions 40, 41 extending axially in opposite directions from the flange 33. Each portion 40, 41 has an annular channel 42 formed on its outer peripheral surface which merges into the flange 33. Secured to the sleeve 39 is a journal bearing unit 43 which includes a pair of axially spaced journal bearings 44 which may be made of babbitt or other suitable material and are provided with conventional lubricant distributing grooves (not shown). A sleeve of resilient material 45 such as synthetic rubber is interposed between the journal bearings 44 and the sleeve 39 to provide limited flexibility between the stationary sleeve 39 and the shaft 10 and to equalize the bearing loads. A plurality of inwardly extending passageways 46 are formed in the portions 40, 41, resilient sleeve 45, and the journal bearings 44 for establishing lubricant communication from the bottom of the channel 42 to the bearings surfaces 47. The upper portion of each compartment 34, 35, designated by numerals 48, 49, respectively, function as lubricant receiving chambers and are each defined by the interior wall 50 of the shell 24, the flange 33 and the sleeve 39.

From the above described bearing structure it will be obvious that a portion of the bearing surfaces 47 are continually submerged in lubricant since the normal level of the lubricant contained in the reservoirs 36, 37 is above the bearing surfaces. However, the problem of providing a costly bearing seal to prevent the lubricant leakage from the ends of the shaft does not exist because the normal level of the lubricant, as indicated by numeral 38, is well below sealing surface. Upon rotation of the shaft 10 the disks 16 and 18 are caused to rotate in the compartments 34 and 35, respectively, and due to centrifugal force, lubricant from the reservoirs 36, 37 is thrown radially outwardly therefrom. The disks 16 and 18 are constructed with a plurality of holes 51 therethrough to increase the pumping action of the disks. It will be also noted that the outer marginal edge 52 of each disk 16, 18 is curved toward the flange 33 to direct the lubricant to the lubricant receiving chambers 48, 49.

The interior wall 50 of the shell 24 and the flange 33 act as baffle means for guiding the lubricant to the annular channels 42 where the lubricant flows to the bearing surfaces 47 through passageways 46.

The embodiment of the invention chosen for the purposes of illustration and description herein is that preferred as the result of selective tests based upon requirements for achieving the objects of the invention and developing the utility thereof in the most desirable manner, due regard being had to existing factors of economy, simplicity of design and construction, and the improvements sought to be effected. It will be appreciated, therefore, that the particular structural and functional aspects emphasized herein are not intended to elude, but rather to suggest, such other adaptations and modifications of the invention as fall within the spirit and scope of the invention as defined in the appended claims.

What is claimed is:

1. A bearing comprising a rotatable shaft, a housing surrounding a portion of said shaft; a flange disposed normal to the rotational axis of said shaft projecting inwardly from the interior surface of said housing, said flange serving as one wall of a lubricant reservoir formed in the bottom of said housing; a sleeve encircling said shaft secured to said flange, said sleeve having a portion extending axially from said flange, said portion having an outwardly extending flange formed thereon axially spaced from and of shorter radial length than said inwardly extending flange; a journal bearing member secured to said sleeve having a bearing surface for rotatably supporting said shaft; means for lubricating said bearing surface from lubricant contained within said reservoir including a lubricant receiving chamber defined by a portion of the interior wall surface of said housing, the inwardly and outwardly extending flanges, and a portion of the outer surface of said sleeve extending between said flanges, means establishing lubricant communication between said chamber and said bearing surface, and lubricant conveying means for transferring lubricant from said lubricant reservoir to said chamber.

2. The combination as set forth in claim 1 in which said lubricant conveying means includes an annular disk rotatable with said shaft adapted to dip into the lubricant contained in the lubricant reservoir and fling the same into the chamber.

3. The combination as set forth in claim 2 in which the outer periphery of said disk is curved toward said chamber.

4. A bearing comprising a rotatable shaft, a housing surrounding a portion of said shaft; a flange disposed normal to the rotational axis of said shaft projecting radially inwardly from the interior surface of said housing, said flange serving as a partition between a pair of axially spaced lubricant reservoirs formed in the bottom of said housing; a sleeve encircling said shaft secured to said flange, said sleeve having portions thereof extending on opposite sides of said flange, each of said sleeve portions having an outwardly extending annular lip formed thereon, said lips being axially spaced from and of shorter radial length than said flange; a journal bearing member secured to said sleeve having bearing surfaces for rotatably supporting said shaft, each of said bearing surfaces being radially aligned with a respective sleeve portion; means disposed on each side of said flange for lubricating said bearing surfaces from lubricant contained in said reservoirs, each of said means includes a lubricant receiving chamber, each of said chambers being defined by a portion of the interior wall of said housing, the flange, an annular lip, and a portion of the outer surface of said sleeve axially extending between said flange and said lip, a plurality of radially inwardly extending passageways for establishing lubricant communication between said chambers and said bearing surfaces, and lubricant conveying means associated with each chamber and the lubricant reservoir disposed on the same side of the flange as the chamber for transferring lubricant from said lubricant reservoir to said chamber.

5. The combination as set forth in claim 4, in which each of said lubricant conveying means includes an annular disk rotatable with said shaft adapted to dip into the lubricant contained in the lubricant reservoir associated therewith.

6. The combination as set forth in claim 5, in which the outer periphery of each disk is curved toward its respective lubricant receiving chamber.

7. A bearing comprising a horizontally disposed rotatable shaft, a housing surrounding a portion of said shaft, a first sleeve fixed to said shaft within said housing for rotation therewith; a vertically disposed flange projecting radially, inwardly from the interior surface of said housing, said flange serving as a partition between a pair of axially spaced lubricant reservoirs adapted to be formed in the bottom of said housing below said shaft; a second sleeve concentric with said first sleeve and being secured intermediate its ends to said flange, the ends of said sleeve being defined by radially outwardly lips of less radial length said said flange; a journal bearing member fastened to said second sleeve having a pair of axially spaced, cylindrical bearing surfaces for engaging the outer surface of said first sleeve; means disposed on each side of said flange for lubricating said bearing surfaces from lubricant contained in said reservoirs, each of said means includes an annular lubricant receiving chamber, each of said chambers being defined by a portion of the interior wall surface of said housing, the flange, a lip and a portion of the outer surface of said second sleeve extending between said lip and said flange, and a plurality of radially, inwardly extending passageways through said second sleeve and bearing journal member for establishing lubricant communication between said chamber and said bearing surface associated therewith, and lubricant conveying means associated with each chamber and the lubricant reservoir disposed on the same side of the flange as the chamber for transferring lubricant from said lubricant reservoir to said chamber.

8. The combination as set forth in claim 7 in which said lubricant conveying means associated with each chamber and the lubricant reservoir disposed on the same side of the flange as the chamber includes a circular disk rotatable with said shaft, said disk being adapted to dip into the lubricant contained in the lubricant reservoir and fling the same to the chamber.

9. A bearing comprising a rotatable shaft, a housing surrounding a portion of said shaft, a flange disposed normal to the rotational axis of said shaft projecting inwardly from the interior surface of said housing, said flange serving as one wall of a lubricant reservoir formed in the bottom of said housing; a sleeve encircling said shaft secured to said flange, said sleeve having a portion extending axially from said flange, said portion having an annular channel formed on the outer surface thereof; a journal bearing member secured to said sleeve having a bearing surface for rotatably supporting said shaft, a plurality of passageways for establishing lubricant communication between said channel and said bearing surface; means for moving lubricant contained in said reservoir radially outwardly, said means including a disk rotatable with said shaft adapted to dip into the lubricant contained in said reservoir; and baffle means for directing the lubricant moved radially outwardly by said disk toward said channel, said baffle means including a portion of the interior surface of said housing radially aligned with said channel, said portion of the interior surface tapering radially inwardly toward said flange.

10. A bearing comprising a rotatable shaft, a housing surrounding a portion of said shaft provided with a pair of aligned circular openings; a flange disposed normal to the rotational axis of said shaft extending inwardly from the interior surface of said housing, said flange serving as a partition between a pair of axially spaced lubricant reservoirs formed in the bottom of said housing below the level of said openings; a first sleeve secured to said flange encircling said shaft, said sleeve having portions extending axially from each side of said flange, said portions each having radially outwardly extending lips formed thereon, said lips being of shorter radial length than said flange; a second sleeve secured to and rotatable with said shaft; a journal bearing member secured to said first sleeve having bearing surfaces for rotatably engaging said second sleeve said bearing surfaces having a diameter greater than the diameter of said circular openings whereby portions of said bearing surfaces are continually immersed in lubricant; lubricant receiving chamber means disposed on each side of said flange, each of said chamber means being defined by said flange, a portion of the interior wall surface of said housing, a lip, and a portion of the outer surface of said first sleeve extending between said lip and flange; a plurality of passageways for establishing lubricant communication between each of said lubricant receiving chamber means and said bearing surfaces; means for moving lubricant contained in said reservoirs radially outwardly to said lubricant receiving chamber means, said means including a pair of disks rotatable with said shaft, each of said disks being adapted to dip into lubricant contained in a respective reservoir and deliver the same to a respective chamber means.

PAUL T. BRANTINGHAM.

References Cited in the file of this patent

UNITED STATES PATENTS

| Number | Name | Date |
|---|---|---|
| 471,405 | Terman | Mar. 22, 1892 |
| 1,919,138 | Wake | July 18, 1933 |
| 2,134,621 | Pesarese | Oct. 25, 1938 |
| 2,197,704 | Memetz | Apr. 16, 1940 |
| 2,248,142 | Wallgren | July 8, 1941 |

FOREIGN PATENTS

| Number | Country | Date |
|---|---|---|
| 605,112 | Germany | Nov. 5, 1934 |
| 786,915 | France | Sept. 14, 1935 |